(12) United States Patent
Caillas

(10) Patent No.: US 6,680,105 B2
(45) Date of Patent: Jan. 20, 2004

(54) PEELABLE BLOCK COMPRISING SHEETS OF IDENTIFIABLE THICKNESS

(76) Inventor: Jean-Jacques Caillas, 5, rue de Beauvon, Versailles (FR), 78000

( * ) Notice: Subject to any disclaimer, the term of this patent is extended or adjusted under 35 U.S.C. 154(b) by 0 days.

(21) Appl. No.: 10/216,813

(22) Filed: Aug. 13, 2002

(65) Prior Publication Data
US 2003/0049421 A1 Mar. 13, 2003

(30) Foreign Application Priority Data
Aug. 14, 2001 (FR) .............................................. 01 10828

(51) Int. Cl.$^7$ ................................................. B32B 7/02
(52) U.S. Cl. ........................ 428/204; 428/213; 428/214
(58) Field of Search ................................ 428/195, 204, 428/213, 214

(56) References Cited

U.S. PATENT DOCUMENTS 3,755,935 A * 9/1973 Annenberg .................... 40/2.2
4,526,641 A 7/1985 Schriever et al.
5,544,193 A * 8/1996 Devaud-Pledran et al. ... 372/96

FOREIGN PATENT DOCUMENTS

GB 577 354 5/1946

* cited by examiner

*Primary Examiner*—Cathy Lam
(74) *Attorney, Agent, or Firm*—Young & Thompson

(57) ABSTRACT

The peelable block includes a stack of sheets, each one of a predetermined thickness. The stack of sheets includes at least one group of transparent successive sheets. The stack of sheets includes an identification sheet on which at least one distinctive sign is formed, arranged so as to be visible through a group of successive transparent sheets.

20 Claims, 2 Drawing Sheets

PEELABLE BLOCK COMPRISING SHEETS OF IDENTIFIABLE THICKNESS

BACKGROUND OF THE INVENTION

The present invention relates to a peelable block comprising a stack of sheets, each one of a predetermined thickness.

DESCRIPTION OF THE RELATED ART

In many mechanisms requiring accurate adjustments, it is known to use peelable blocks so as to compensate for the manufacturing tolerances. These blocks provide correct positioning for the elements of the mechanism with respect to each other.

Such peelable blocks comprise a stack of sheets of predetermined thickness bonded to each other. So that the block fits exactly in the gap having to be filled, the elementary sheets forming the block are removed one by one until the overall thickness desired for the block is obtained.

The use of such blocks avoids machining and grinding blocks having a solid metal thickness.

These blocks are used especially in transmission members, gearboxes, bearings and reduction gears.

It is known to provide, depending on the thickness of the block, a first group of sheets having a first thickness then a second group of sheets having a second thickness in order to reduce the cost of the peelable blocks. These thicknesses are, for example, equal to 0.1 mm and 0.05 mm.

When the blocks consist of metal sheets, the sheets of different thicknesses are generally made from different materials. Thus the colours of the sheets are different.

The operator in charge of adjusting the thickness of the block may easily determine, from the colour of the sheets or from their surface state, the number and type of sheets having to be removed in order to obtain the desired thickness.

On the other hand, when the block consists of sheets made of a polymer, the sheets of different thicknesses are generally made from the same material, such that they have the same colour.

It is thus extremely difficult for the operator to differentiate the sheets according to their thickness when adjusting the block.

The polymer sheets may be coloured according to their thickness. However, the colour of the sheets is the underlying cause of an additional cost, during manufacture of the block.

SUMMARY OF THE INVENTION

The aim of the invention is to provide a low-cost peelable block allowing the identification of the sheets capable of being removed.

To this end, the subject of the invention is a peelable block of the aforementioned type, characterized in that the said stack of sheets comprises at least one group of transparent successive sheets, and in that the said stack of sheets comprises an identification sheet on which at least one distinctive sign is formed, arranged so as to be visible through a group of successive transparent sheets.

According to particular embodiments, the block comprises one or more of the following characteristics:

it comprises a single identification sheet;

the identification sheet is opaque;

the sheets of any one group all have the same thickness;

the identification sheet has the same thickness as the sheets of a group of sheets;

it comprises a first and a second group of sheets, the sheets of which have a first and a second thickness, respectively, the first and second groups of sheets being arranged on either side of the identification sheet, which identification sheet comprises at least one distinctive sign arranged so as to be visible through only one group of sheets;

the identification sheet comprises two different distinctive signs, one visible only through the first group of sheets and the other visible only through the second group of sheets;

it comprises two identification sheets interposed between the two groups of sheets, each identification sheet comprising at least one distinctive sign arranged so as to be visible only through an associated group of sheets;

the said sheets are made of a polymer;

the identification sheet comprises additional marks which are visible through at least one group of sheets;

it comprises a rigid blank having a thickness greater than the thickness of the sheets or of each group of sheets, which blank is included in the stack of sheets; and the said blank forms the said identification sheet.

BRIEF DESCRIPTION OF THE DRAWINGS

The invention will be better understood on reading the following description, given solely by way of example and made with reference to the drawings, in which.

DESCRIPTION OF THE PREFERRED EMBODIMENTS

Figure 1:
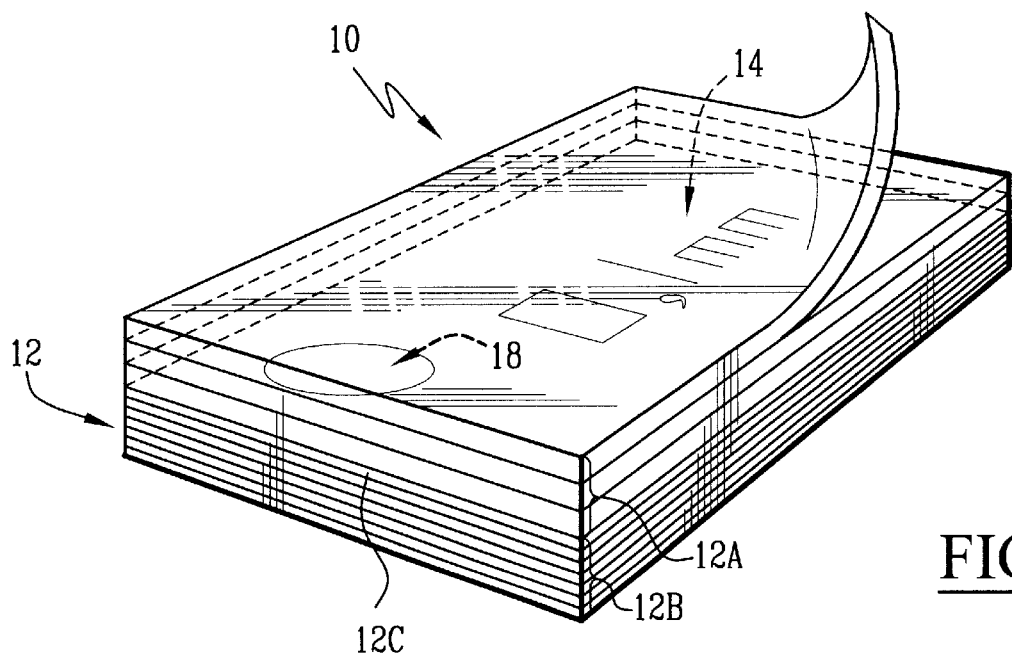
FIG. 1 is a perspective view of a peelable block according to the invention seen from a first side.
Figure 2:
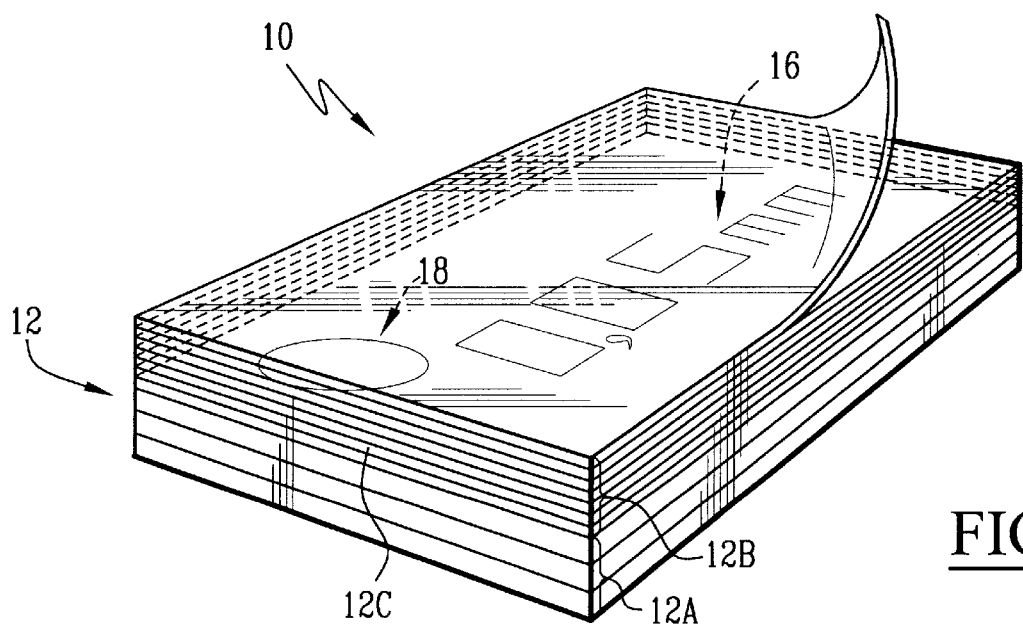
FIG. 2 is a perspective view of the peelable block of FIG. 1, the latter having been turned over.
Figure 3:
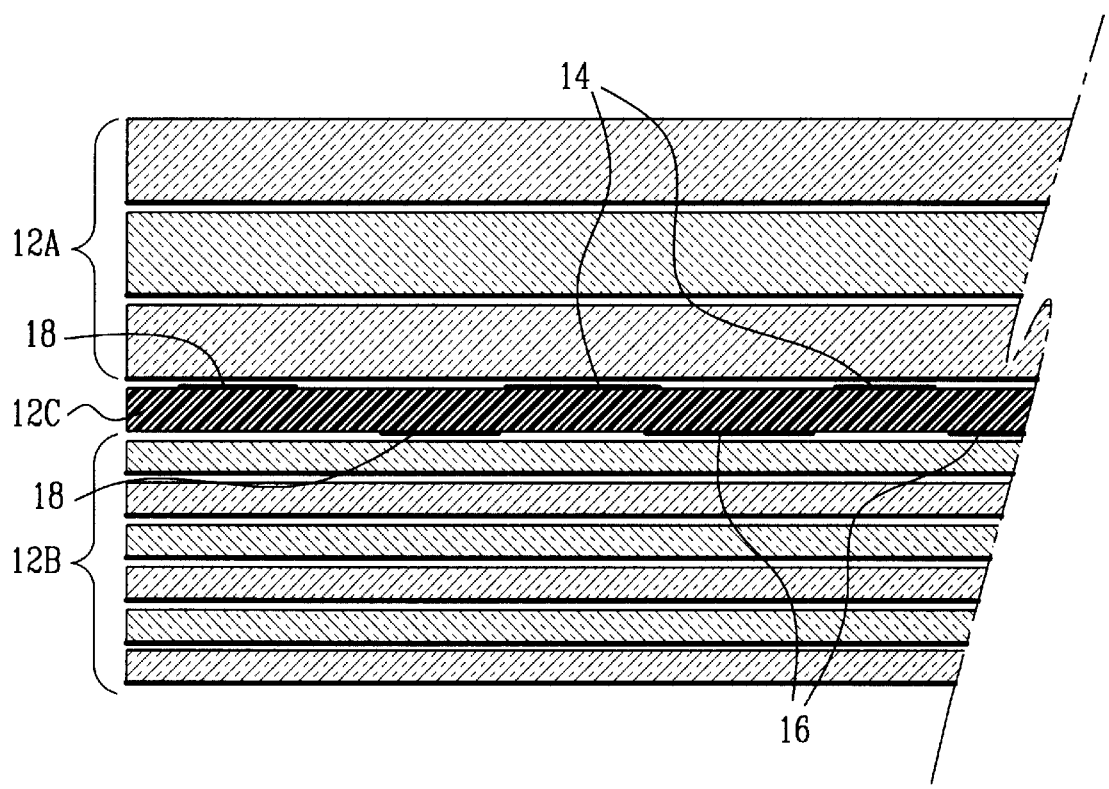
FIG. 3 is a cross-sectional view of the block of FIGS. 1 and 2.

The figures show a peelable block 10 intended to be interposed between two mechanical elements of a mechanism.

This block comprises a stack of sheets 12. All these sheets have the same surface area and the same outline.

The sheets 12 are kept stacked, for example by a film of adhesive interposed between each of the sheets over the entire surface area of their opposing faces.

The sheets are made from a polymer such as KAPTON or MYLAR (trademarks of DuPont de Nemours). In the figures, the thicknesses of the sheets are exaggerated and their number is reduced for reasons of clarity.

The stack of sheets 12 comprises a first group of transparent sheets 12A having a first particular thickness. All the sheets 12A of this first group have the same thickness. This thickness is, for example, equal to 0.1 mm. Initially, there are 20 sheets 12A.

Moreover, the stack 12 comprises a second group of transparent sheets 12B, all having the same second thickness, this second thickness being different from the first thickness. This second thickness is, for example, equal to 0.05 mm. The number of sheets 12B is, for example, equal to 10. This number is chosen to be large enough so that, after adjusting the block, at least four sheets remain in the block.

Advantageously, the number of sheets 12A of larger thickness is greater than the number of sheets 12B of smaller thickness.

The first group of sheets 12A lies on one side of the block while the second group of sheets 12B lies on the other side of the block.

An identification sheet 12C is placed between the first and second groups of sheets.

According to the invention, the identification sheet 12C has at least one distinctive sign 14 on the side of the identification sheet arranged so as to be visible through at least one of the groups of successive transparent sheets.

In the envisaged embodiment, the identification sheet 12C has, on one of its faces, an inscription 14 indicating the thickness of the sheets 12A. This inscription is, for example, "0.1 mm".

This inscription is printed on the surface of the identification sheet 12C to which the first group of sheets 12A is adhesively bonded, the thickness of which is equal to 0.1 mm.

On its opposite face, the identification sheet 12C comprises another inscription 16 indicating the thickness of the sheets of the second group of sheets 12B. This inscription is, for example, "0.05 mm".

Advantageously, the identification sheet 12C is opaque, such that only one of the two inscriptions 14 or 16 is visible through a group of sheets 12A or 12B. The thickness of the intermediate sheet is preferably equal to the thickness of the sheets of one or other of the groups of sheets 12A and 12B.

Furthermore, and advantageously, the identification sheet comprises, on one and/or the other of its faces, additional inscriptions 18, for example consisting of the name of the company manufacturing the block, or else instructions regarding its use.

When putting such a block in place, the user may easily determine the side on which the sheets of a given thickness are located. This is because, whatever the number of sheets of a given thickness which have already been removed, one or other of the inscriptions 14 and 16 appears through each of the faces of the block. Depending on the visible mark, the user understands that the sheets turned towards him have the thickness indicated on the visible face of the block.

Insofar as only one of the sheets must be printed, the cost of manufacturing such a block is low, it being possible for the other sheets of the block to be made from any transparent film and without it having to be coloured in order to make it possible to distinguish the sheets of a different thickness.

Moreover, insofar as only one of the sheets is printed, the overthickness produced by the inks used for the printing is negligible with respect to the overall thickness of the block. Such would not be the case if all the sheets were provided with a printed distinctive sign.

As a variant, the block comprises a sheet which is very thick compared to groups of transparent sheets. This very thick sheet constitutes a rigid blank, the thickness of which is, for example, between 0.5 mm and 30 mm. The blank is placed in the middle part of the block. The cost of the block incorporating such a blank is low since the blank has a lower cost than a stack of the same thickness formed from sheets of small thickness. The blank constitutes, for example, the identification sheet 12C bearing the inscriptions. As a variant, the blank is separate from the identification sheet 12C. In the latter, it is advantageously thus transparent.

According to yet another variant, the block comprises two successive identification sheets. Each identification sheet bears an inscription representative of the thickness of the immediately adjacent stack of sheets.

Furthermore, advantageously, each identification sheet has a thickness equal to the sheets of the adjacent stack and the thickness of which is written on the identification sheet in question.

The block may therefore be formed easily by assembling two half-blocks consisting of stacked sheets of the same thickness, each half-block comprising an identification sheet bearing inscriptions which show only the thickness of the sheets contained in the half-block.

What is claimed is:

1. Peelable block (10) comprising a stack of sheets (12A, 12B), each one of a predetermined thickness, characterized in that the said stack of sheets comprises at least one group of transparent successive sheets (12A, 12B), and in that the said stack of sheets comprises an identification sheet (12C) on which at least one distinctive sign (14, 16) is formed, arranged so as to be visible through said at least one group of successive transparent sheets (12A, 12B).

2. Block according to claim 1, characterized in that it comprises a single identification sheet (12C).

3. Block according to claim 1, characterized in that the identification sheet (12C) is opaque.

4. Block according to claim 1, characterized in that the sheets (12A, 12B) of any one group all have the same thickness.

5. Block according to claim 4, characterized in that the identification sheet (12C) has the same thickness as the sheets of the one group.

6. Block according to claim 1, characterized in that stack of sheet comprises a first group of sheets (12A) and a second group of sheets (12B), the sheets of which first and second groups of sheets have a first and a second thickness, respectively, the first and second groups of sheets (12A, 12B) being arranged on either side of the identification sheet (12C), which identification sheet (12C) comprises at least one distinctive sign (14, 16) arranged so as to be visible through only one group of sheets.

7. Peelable block according to claim 6, characterized in that the identification sheet (12C) comprises two different distinctive signs (14, 16), one visible only through the first group of sheets (12A) and the other visible only through the second group of sheets (12B).

8. Block according to claim 6, wherein two identification sheets are interposed between the two groups of sheets, each identification sheet comprising at least one distinctive sign arranged so as to be visible only through an associated group of sheets.

9. Block according to claim 1, characterized in that the said sheets (12A, 12B, 12C) are made of a polymer.

10. Block according to claim 1, characterized in that the identification sheet (12C) comprises additional marks (16, 18) which are visible through at least one group of sheets (12A, 12B).

11. Block according to claim 1, characterized in that the identification sheet comprises a rigid blank having a thickness greater than the thickness of the sheets or of each group of sheets, which blank is included in the stack of sheets.

12. Block according to claim 11, characterized in that the said blank is opaque.

13. A peelable block, comprising:
a stack of peelable transparent polymer sheets of a same surface area and outline;
a film of adhesive interposed between each of the sheets over an entire surface area of opposing sheet faces, the stack of sheets comprising a first group of plural sheets and a second group of plural sheets; and an opaque identification sheet disposed between the first and second groups of sheets, a distinctive sign on a first surface of the identification sheet arranged so as to be visible through at least one of the first and second groups of sheets.

14. The block of claim 13, wherein, each of the sheets of the first group of sheets are of a same first thickness, and each of the sheets of the second group of sheets are of a same second thickness, the second thickness being greater than the first thickness.

15. The block of claim 13, wherein, each of the sheets of the first group of sheets are of a same first thickness, and each of the sheets of the second group of sheets are of a same second thickness, the second thickness being less than the first thickness.

16. The block of claim 13, wherein, each of the sheets of the first group of sheets are of a same first thickness, each of the sheets of the second group of sheets are of a same second thickness, and the distinctive sign on the first surface of the identification sheet is an inscription indicating the first thickness.

17. The block of claim 16, wherein, a further distinctive sign is on a second surface of the identification sheet arranged so as to be visible through the second group of sheets, and the further distinctive sign on the second surface of the identification sheet is an inscription indicating the second thickness.

18. The block of claim 17, wherein the identification sheet has a thickness greater than either of the first and second thicknesses.

19. A peelable block, comprising:

a first stack of peelable transparent sheets of a first surface area, a first outline, and a first thickness;

a second stack of peelable transparent sheets of the first surface area, the first outline, and a second thickness;

a first opaque identification sheet adjacent a second opaque identification sheet, the first and second identification sheets being placed between the first stack and the second stack;

a film of adhesive interposed between each of the sheets the first stack, the second stack and the first and second identification sheets;

a first distinctive sign on the first identification sheet arranged so as to be visible through the first stack; and a second distinctive sign on the second identification sheet arranged so as to be visible through the second stack.

20. The block of claim 19, wherein, the first distinctive sign is an inscription indicating the first thickness; and the second distinctive sign a an inscription indicating the second thickness.

* * * * *